Figure 1:
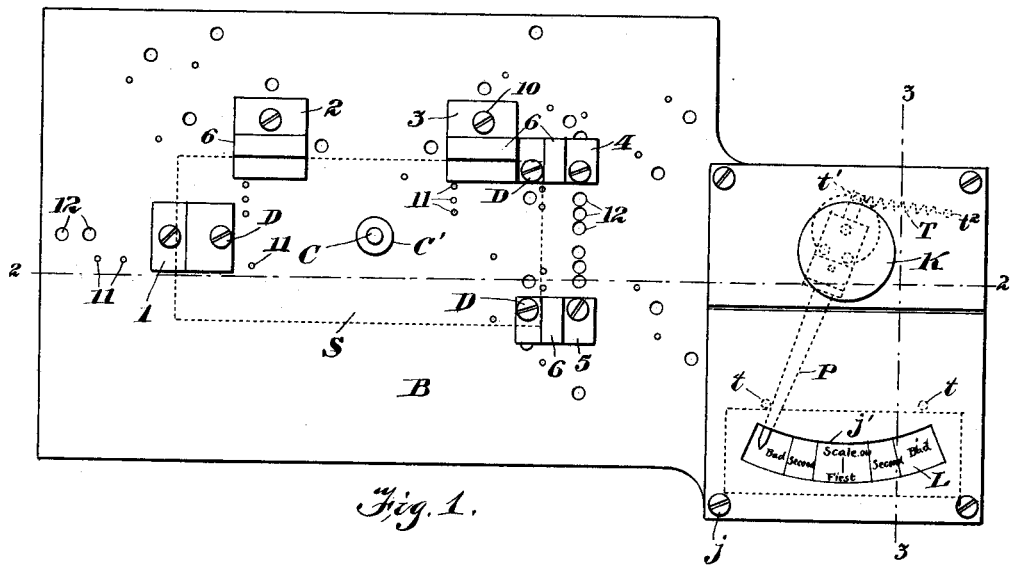

G. A. STANBERY.
MACHINE FOR CLASSIFYING TILES.
APPLICATION FILED APR. 5, 1905.

1,078,883. Patented Nov. 18, 1913.
2 SHEETS—SHEET 1.

WITNESSES:
V. E. Nichols
R. A. Mooney

INVENTOR
George A. Stanbery

BY
Griffin & Bernhard
ATTORNEYS

G. A. STANBERY.
MACHINE FOR CLASSIFYING TILES.
APPLICATION FILED APR. 5, 1905.

1,078,883.

Patented Nov. 18, 1913.

2 SHEETS—SHEET 2.

WITNESSES:
V. E. Nichols
R. A. Mooney.

INVENTOR
George A. Stanbery,
BY
Griffin & Bernhard
ATTORNEYS

UNITED STATES PATENT OFFICE.

GEORGE A. STANBERY, OF ZANESVILLE, OHIO, ASSIGNOR TO AMERICAN ENCAUSTIC TILING COMPANY, LIMITED, OF NEW YORK, N. Y., A CORPORATION OF NEW YORK.

MACHINE FOR CLASSIFYING TILES.

1,078,883.

Specification of Letters Patent. Patented Nov. 18, 1913.

Application filed April 5, 1905. Serial No. 254,004.

*To all whom it may concern:*

Be it known that I, GEORGE A. STANBERY, citizen of the United States, residing at Zanesville, in the county of Muskingum and State of Ohio, have invented certain new and useful Improvements in Machines for Classifying Tiles, of which the following is a specification.

My invention relates to a machine used in the manufacture of tiles for the purpose of determining whether they are straight and true, or to ascertain whether the faces thereof are slightly concave or convex.

During the process of manufacturing tiles they are liable to shrink and warp. It is customary to assort the tiles into grades according as they are straight or warped; and for this classification, it is usual to employ a straight edge, the instrument being laid on the face of the individual tiles so that the operator may determine, by sight, the condition of the tiles, and afterward assort them into different groups according to their condition.

My machine is used by operators for the purpose of rapidly and accurately determining the condition of tiles, and it operates to indicate to the attendant the grade into which individual tiles are to be classified.

In one embodiment of the invention, the machine is calibrated to indicate straight tiles, to classify slightly convex tiles into two or more groups of another grade, and to also indicate the different groups of concave tiles, although the particular standard of classification is not a material part of the invention, and hence may be modified or changed at will.

My machine includes in its construction a rest for the reception of tiles adapted to be placed thereon and to be removed therefrom one after the other, an actuating member adapted to have engagement with the tiles occupying said rest, a suitable dial, and a pointer controllable by the actuating member and adapted to be moved more or less thereby, for indicating on the dial the classification of the individual tiles.

The tile rest in one form of the machine consists of a number of parts fastened individually to a suitable bed and arranged or grouped to support a tile over the actuating member. The parts comprising the tile rest are preferably adjustable with respect to this actuating member so that they may assume positions for supporting tiles of different sizes.

The pointer is held normally by a retractor in a zero position, and with said pointer is combined means for adjusting it with accuracy. Each time the members or parts of the tile support or rest are shifted to receive tiles of different sizes, it is necessary to again bring the machine to the required standard. This is accomplished by the employment of an accurate standard gage and by the manipulation of the adjusting device for the pointer.

The several working parts of my machine or instrument of precision are so constructed that in the operation thereof wear is taken up automatically. As the machine is adapted to be adjusted quite frequently to standardize it, the work of classifying tiles can be effected with accuracy and dispatch.

Reference is to be had to the accompanying drawings, forming a part of this specification, wherein like characters of reference are used to indicate corresponding parts in all the figures.

Figure 2:
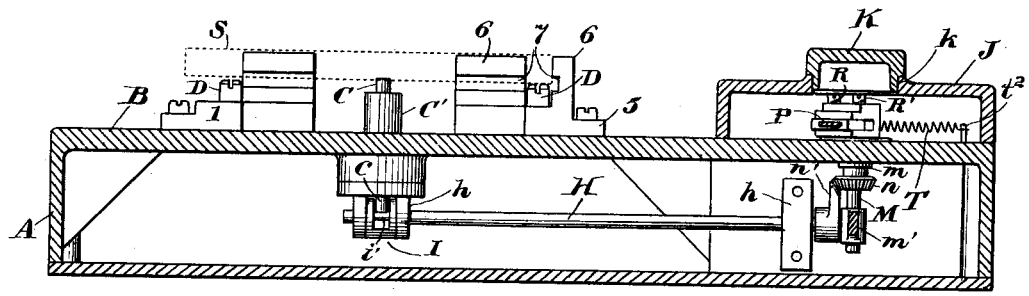
Figure 3:
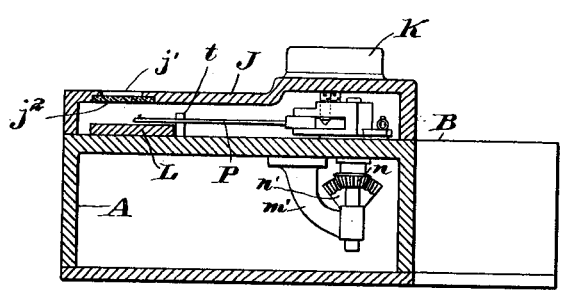
Figure 4:
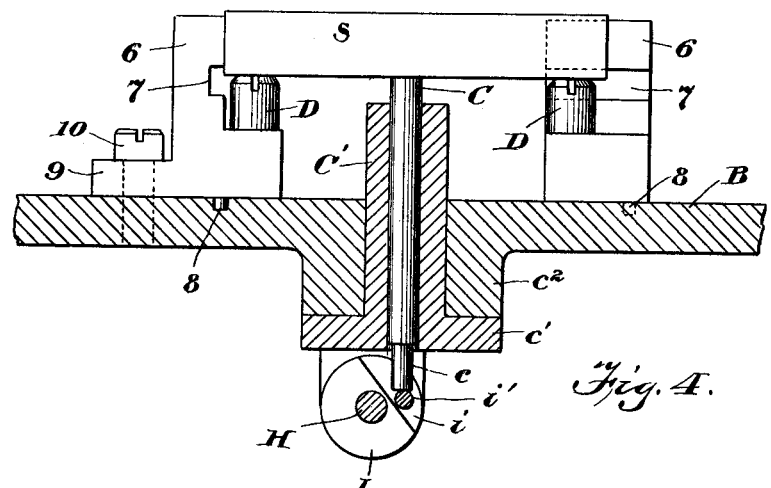
Figure 5:
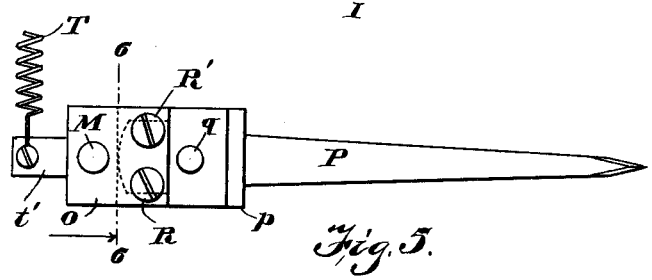
Figure 6:
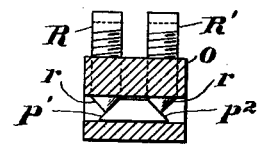
Figure 7:
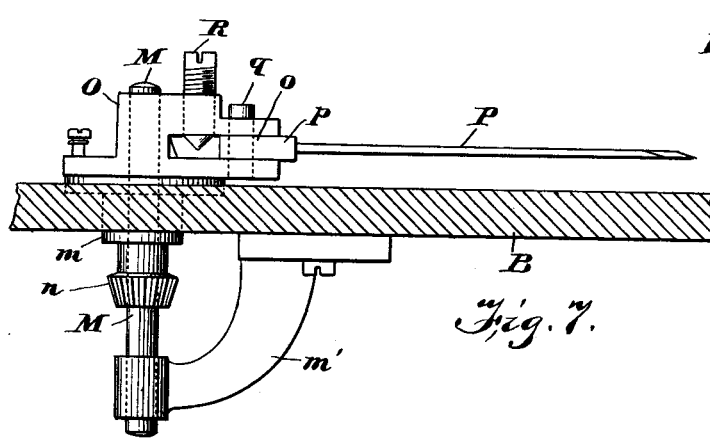

Figure 1 is a plan view of a machine for classifying tiles constructed in accordance with my invention. Fig. 2 is a vertical longitudinal section in the plane of the dotted line 2—2 of Fig. 1. Fig. 3 is a vertical transverse section in the pane of the dotted line 3—3 of Fig. 1. Fig. 4 is another vertical cross section through a part of the bed and representing the actuating member and a tile rest or support in elevation. Fig. 5 is an enlarged detail view of the index and the means for adjusting the same. Fig. 6 is a detail cross section on the line 6—6 of Fig. 5. Fig. 7 is a sectional elevation through a part of the bed and the working parts of the index mechanism.

A designates a frame or casing which may be of any suitable or preferred construction for containing some of the working parts of my new classifying machine. The top of this casing constitutes a bed B for the reception of the parts or members comprising a tile rest or support. These members are indicated by the numerals 1, 2, 3, 4 and 5, each of which consists of a block adapted to be held fixedly in place on the bed by suitable means which permits of the adjustment of the member with relation to the other members and to an actuating member C. The blocks 2, 3, 4 and 5 are each provided with an upstanding head 6, and each of said blocks are shown as having a groove 7 in one face thereof, although this groove is not material. Each block is provided at its under side with a pin or stud 8, and said block is furthermore provided with a foot flange or lug 9, the latter being perforated for the reception of a clamping screw 10. The bed B is provided with a number of smooth openings 11, and with a corresponding number of threaded or tapped openings 12, the last mentioned openings being considerably larger than the smooth openings 11. The openings 11, 12, are provided in the bed B at the positions which are to be assumed by the members 1 to 5 inclusive, comprising the tile rest or support, said members being detachable from the bed, so as to be adjusted to different positions thereon for the reception or accommodation of tiles which vary in size. It will be understood that the blocks comprising the tile rest or support are adjustable either crosswise or lengthwise of the bed for the purpose of receiving tiles which may vary in length or width, or in both directions. The stud 8 of each member or block is adapted to occupy one of the holes 11, while the screw 10 is threaded into one of the tapped holes 12, thereby fastening the block in place against any tendency to turn out of position or to become detached from the bed.

The blocks or members forming the tile rest are grouped or arranged around the tile-actuated member C in the manner shown by Fig. 1, whereby the edge portions of a tile are adapted to occupy the blocks or members, and the middle part of the tile is adapted for engagement with the end of said member C as represented by Figs. 1, 2 and 4. By providing the blocks 2, 3, 4 and 5 with the upstanding heads 6 the tile is prevented from moving out of position during the operation of testing or gaging the same, but the member 1 of the rest or support is not provided with the upstanding head, thus permitting the tile to be readily slipped into position on the other members of the support.

Under some circumstances I may place the tiles directly on the upper faces of the members or blocks, but it is preferred to employ a leveling screw D in conjunction with each member or block. The leveling screws are attached individually to the blocks or members so as to project above the upper faces thereof, each screw being disposed alongside of the head 6, which head extends a distance above the upper end of the screw, as represented more clearly by Fig. 4. It is understood that the leveling screws may be adjusted for the purpose of furnishing an accurate support for the tile adapted to be placed upon the rest or holder.

The actuating member C is represented by Fig. 4 in the form of a rod or plunger adapted to pass through the bed B and to extend to the plane of the leveling screws D. This plunger is reduced at its lower end to provide a foot tenon $c$, the same being of hardened metal so as to minimize the wear and preserve the accuracy of the plunger. A bushing $C'$ is secured in the bed B at a central point with respect to the group of blocks comprising the tile rest or support. The bushing is provided at its lower end with an annular flange $c'$ adapted to engage with a boss $c^2$, which is provided on the under side of the bed plate B. The bushing is shown by Fig. 4 as extending above the bed B, and said bushing is provided with a vertical passage or opening for the accommodation of the stem or plunger C, the latter being slidable freely in the bushing and being also removable at will therefrom.

H designates a horizontal shaft which ranges lengthwise of the casing A, below the bed B thereof. This shaft is journaled in appropriate bearings $h$, which are provided within the casing, and at one end this shaft is provided with a disk I having a notch $i$ cut therein, see Fig. 4. In this notch is a hardened steel pin or tooth $i'$, which is rigid or integral with the disk I, so that it will turn with the shaft H. The lower extremity of the plunger C fits within the notch $i$ of the disk, and it rests upon the pin or tooth $i'$, whereby the plunger and the shaft are operatively combined in a way which operates to turn or rock the shaft H by a downward movement of the plunger C under the pressure of a tile upon the upper end of said plunger.

An index mechanism is provided at one corner of the casing or bed of the machine, said index mechanism being housed or contained within a smaller casing J fastened in a suitable way to the bed plate B as by the screws $j$. This casing J is provided with a viewing slot $j'$, adapted to be covered by a transparent pane $j^2$, and said casing is furthermore provided with an opening $k$ which is closed by a removable cap or cover K.

A dial or graduated plate L is fastened to the bed B, within the casing J and below the viewing slot $j$. This dial is calibrated to denote the classes of tiles, and the groups or sub-divisions within the respective classes. The calibration of the dial is arbitrary, but as shown more particularly by Fig. 1, the dial has a central index character denoting the standard tile of first quality. On opposite sides of this line denoting the standard are spaces which are designated as the first quality spaces; on opposite sides of these spaces are other spaces denoting the second quality, and on opposite sides of the second quality spaces are further spaces denoting the inferior quality of tiles. It will be understood that the graduation of the scale may be modified or changed within wide limits.

M designates a vertical shaft which passes through a bushing $m$ provided in the bed plate B directly below the removable cap K, the lower portion of said shaft having a bearing in a hanger $m'$, which is fixed to the bed plate. Said shaft is arranged close to one end of the rock shaft H, and the two shafts are geared one to the other by any suitable form of gearing, such as by the beveled pinion $n$, which is fixed to the shaft M, said beveled pinion having intermeshing engagement with a sector $n'$, which is fixed to one end of the rock shaft H. The upper end of the vertical shaft M protrudes above the bed plate B for a suitable distance, and on this shaft is rigidly fixed a carrier O, the latter being adapted to oscillate or turn with the shaft M when it is actuated by the shaft H, the latter being in turn operated by the plunger C. This carrier O is equipped with the index or pointer P and with means for adjusting the pointer relatively to the carrier and to the graduations of the dial L, whereby the machine may be accurately adjusted each time the members of the tile rest or support are shifted for the accommodation of different sizes of tiles. The pointer P consists of a blade or member of any suitable material, dimensions or form. Said pointer is in one piece with or attached to a head $p$, one end of which is provided with reversely inclined bevels $p'$ $p^2$, see Fig. 6. The carrier O is provided in one side with a slot or recess $o$, in which is received the head $p$ of the pointer and the wedge shaped or beveled part of said head. The pointer is pivotally connected with the carrier O by means of a pin $q$, which passes through the carrier O and the head $p$ of the pointer, said pivot being located quite close to the beveled or wedge shaped portion of the pointer head. The carrier O is furthermore equipped with adjusting screws R R', the same being threaded into tapped openings which are provided in the carrier. The screws have beveled or pointed ends $r$, as shown by Fig. 6, and they are adapted for engagement with the beveled faces $p'$ $p^2$ of the wedge shaped portion of the pointer head. The screws are adapted to be tightened against the wedge portion of the pointer for the purpose of clamping the same in a predetermined position relative to the carrier O, but by slackening one screw and adjusting the other, the beveled ends of the screws are adapted to so act on the wedge shaped part of the pointer head so that the pointer may be turned on its pivot $q$ to accurately adjust the pointer to a desired position for the purpose of standardizing the machine. This adjustment of the pointer may take place independently of the adjustment of the other parts of the machine, although the adjustment is made in view of a gage standard S, which may be employed in connection with the rests and the plunger C. Such adjustment of the pointer can be easily secured by removing the cap or cover K and inserting a screw driver or other tool through the opening $k$, access to the screws R R' being easily obtained through the opening $k$, as will be seen by reference to Figs. 1 and 2 of the drawings.

The oscillating movement of the pointer P in either direction is arrested by stops $t$, fixed to the bed plate B, and said pointer is held normally in the position indicated by Fig. 1 by the tension of a retractor T, the same being represented in the form of a coiled spring, one end of which is attached to a lug $t'$ on the carrier O, while the other end is anchored as at $t^2$ to the bed plate. This spring holds the carrier and the pointer in a position where the latter engages with one of the stops. This spring also acts on the carrier to turn the vertical shaft M, so that one tooth of the pinion $n$ is engaged with one beveled tooth on the sector $n'$ of the rock shaft H, whereby the parts are placed under tension so as to compensate for wear due to the friction of some of the working parts of the machine.

The operation is as follows:—Before the machine is used for classifying tiles it is brought to standard by the employment of a gage S, adapted to be placed on the members forming the tile support and to actuate the plunger C in a way to make the pointer indicate the standard measurement on the dial L. Should the pointer move to any position other than the central standard gage indication the operator should remove the cap K, and employ a suitable implement for adjusting the screws R R' either individually or successively so as to make the pointer move to the central graduation on the scale. The cover K is now replaced and the standard gage is removed, after which the machine is in condition for operation. The operator places the tiles one after the other on the members of the rest, and the leveling screws thereof, so that one face of the individual tiles is adapted for engagement with the end of the plunger C. If the face of the tile is straight and true, the plunger C will be depressed a given distance so as to turn the shafts H, M, a certain predetermined distance, thereby making the pointer P indicate the central standard graduation on the dial. Should the face of one tile be slightly convex the parts will be actuated for the pointer to indicate the first, second or "bad" division of the scale to the right of the central graduation, but should the face of the tile be concave, the pointer will indicate one of the three divisions at the left of the central graduation. From this description it is clear that accurate, convex and concave tiles may be readily gaged by the use of the machine and the divisions or groups of either convex or concave tiles will be accurately indicated by the pointer on the scale, thus enabling the operator to readily classify and assort the tiles into different grades or standards of quality.

It is frequently necessary to change the relation of the members 1, 2, 3, 4, 5, comprising the tile rest or support, for the purpose of enabling the machine to be used in classifying tiles of different sizes. The adjustment of the different members is readily effected by releasing the clamping screws 10, and changing the positions of one or more of the members on the bed, said member or members being shifted relatively to the plunger C. Should it be required the screws D may be adjusted to afford a perfectly level support for the tiles which are to be classified, but in nearly every instance it is found that the relation of the pointer P to the carrier O must be adjusted in order to bring the machine up to standard when the standard gage S (the same being made with a perfectly straight face), is placed on the tile rest. It is obvious that the required adjustment of the pointer is readily obtained by the manipulation of the screws R R' in the manner heretofore described.

Changes in the form, size, proportion, and minor details in construction may be made without departing from the spirit of the invention or sacrificing any of the advantages thereof, and I, therefore, reserve the right to make such alterations and modifications as fairly fall within the scope of my invention.

Having thus described my invention, what I claim as new and desire to secure by Letters Patent is:—

1. In a machine for detecting the warpage in the plane surfaces of tiles and for classifying said tiles, the combination of an index mechanism including a part graduated to denote the classes into which the warped tiles are to be assorted and a pointer movable relative to said graduated part, a tile rest embodying a plurality of members upon the faces of which the tile is to be positioned, an actuating member the tile engaging face of which is normally in the same plane as the tile engaging faces of the members composing said rest, said actuating member being movable relative to the tile rest members, and means for communicating the movement of said actuating member to the pointer of said index mechanism, the members composing said tile rest being positioned in the same horizontal plane and said members being shiftable relative to each other and to the actuating member for the purpose of positioning said members to receive tiles which vary in size.

2. In a machine for detecting the warpage in the plane surfaces of tiles and for classifying said tiles, the combination of an index mechanism including a part graduated to denote the classes into which the warped tiles are to be assorted and a pointer movable relative to said graduated part, a tile rest embodying a plurality of members upon the faces of which the tile is to be positioned, a slidable actuating member the tile engaging end of which is normally in the same plane as the tile engaging faces of the members composing said tile rest, said actuating member being slidable in a direction at right angles to the plane of the tile engaging faces of said members composing the tile rest, and means for communicating the movement of the actuating member to the pointer of the index mechanism, said members of the tile rest being individually secured in a fixed position and each member being movable in a horizontal direction relative to the other members of said tile rest whereby said members are capable of supporting tiles which vary in size and of accurately positioning said tiles relative to the actuating member.

3. In a device for classifying tiles, an index mechanism provided with a dial which is graduated to denote the classes into which tiles are to be assorted, an actuator member adapted to be operated by an irregularity in the surface of a tile under test, said actuator member coöperating with said index mechanism, and work supporting means in a predetermined standard relation to the actuator member, said work supporting means comprising a plurality of members which are shiftable toward or from the actuator member, whereby tiles of varying sizes may be tested on the machine.

4. In a device for classifying tiles, an index mechanism provided with a dial which is graduated to denote the classes into which tiles are to be assorted, an actuator member adapted to be operated by an irregularity in the surface of a tile under test, said actuator member coöperating with said index mechanism, and a plurality of work supporting members, said members being shiftable individually and toward or from the actuator member for the purpose of supporting tiles of different sizes in position for engagement with said actuator member.

5. In a device for classifying tiles, an actuator member adapted to be operated by an irregularity in the surface of a tile, a plurality of work supporting members adjustable to different positions relative to said actuator member, whereby tiles of different sizes may be held in predetermined positions relative to the actuator member, and means operated by the actuator member for denoting the classes into which the various tiles are to be assorted.

6. In a device for classifying tiles, a group of supporting members, the tile-engaging surfaces of which are in the same plane, a plunger operating in a space bounded by said members and adapted to be moved by an irregularity in the surface of a tile when it is placed upon said members, and index mechanism operated by said plunger, said supporting members having means for precluding movement of the tile when it is placed thereon and to determine the position of the tile relative to the plunger.

7. In a machine for classifying tiles, a bed or frame, a work rest or holder thereon comprising a group of work-supporting members adjustable toward and from each other, said members having seating surfaces adapted for engagement with the edge and face of the work, an index mechanism, and means actuated by variations in the surface level of the work for operating said index mechanism accordingly.

8. In a machine for classifying tiles, a work rest or holder comprising a group of members each having a seating surface adapted for engagement with the edge and a face of the work, an index mechanism, a member operating in the space bounded by the members of the work rest or holder and adapted to be operated by engagement with the surface of the work, and transmitting devices for amplifying the movement of said member and communicating such movement to the index mechanism.

9. In a device of the class described, means for supporting the work, a member adapted for engagement with work adapted to be placed on said member, and an index mechanism operated by said member, the pointer of said index mechanism being mounted separately and associated with means whereby its position may be adjusted or shifted independently of the movement which may be imparted thereto by the aforesaid work-actuated member.

10. In a device of the class described, a work actuated member, and an index mechanism adapted to be actuated by said member, said index mechanism including a pointer having an adjusting wedge and means engaging with said wedge for adjusting the pointer independently of the movement imparted thereto by the work actuated member.

11. In a device of the class described, a work actuated member, and an index mechanism adapted to be actuated by said member, said index mechanism including a swinging carrier, a pointer having a wedge, and means for clamping the pointer on the carrier and for adjusting said pointer independently of the movement given thereto by said member.

12. In a device of the class described, a work actuated member, and an index mechanism adapted to be actuated by said member, said index mechanism including a carrier, a pointer, and means on the carrier for adjusting the pointer independently of the movement adapted to be given thereto by the member.

13. In a device of the class described, a work actuated member, and an index mechanism adapted to be actuated by said member, said index mechanism including a carrier, a pointer having a wedge, and devices coöperating with said wedge for adjusting and holding the pointer relative to the carrier.

14. In a device of the class described, a pivoted index carrier, an index pivoted to said carrier, a part of said index being wedge shaped in cross section, and adjusting screws mounted in said index carrier and engaging the wedge shaped part of the index, said screws being separately adjustable in the carrier and operating, also, to clamp the index and the index carrier in fixed relation to each other.

15. In a device of the class described, a carrier, a pointer wedge shaped in cross section and connected with the carrier, and separately adjusted screws coöperating with the wedge portion of the pointer for adjusting the latter and operating, also, to clamp said pointer in fixed relation to said carrier.

16. In a device of the class described, a work-actuated member, a rock shaft coöperating therewith, an index shaft operated by the rock shaft, a pointer movable with the index shaft, and means for adjusting the pointer relative to the index shaft independently of its movement therewith.

17. In a device of the class described, a work-actuated member, a rock shaft coöperating therewith, an index shaft operated by the rock shaft, a carrier movable with the index shaft, a pointer on the carrier, and means for adjusting the pointer relative to the carrier.

18. In a device of the class described, a rock-shaft, a work-actuated member coöperating therewith, an index-shaft operated by the rock-shaft, a carrier on the index-shaft, a pointer pivoted to and movable with said carrier, means for adjusting the pointer on, and clamping the same fixedly to, said carrier, and a dial traversed by said pointer.

19. In a device of the class described, a hollow bed or frame, a horizontal rock-shaft journaled in said bed or frame, a notched member provided with a single tooth, said member being carried by said rock-shaft, a spindle slidable in said bed and seated on said tooth of the notched member, whereby said member and the rock-shaft are turned by the depression of said spindle, and an index mechanism operated by the rock-shaft.

20. An instrument for detecting the warpage in the plane surfaces of tiles and for classifying said tiles, embodying an index mechanism including a pointer and a part graduated to denote the classes into which tiles are assorted, an actuating member positioned for a tile engaging face thereof to lie in the plane of the undersurface of a tile to be tested, tile positioning means in coöperative relation with said actuating member for presenting a certain surface of the tile to be tested opposite to the tile engaging face of said actuating member, and transmitting devices intermediate the actuating member and the pointer of said index mechanism, said tile positioning means having parts arranged for engagement with the edges and one face of the tile to be tested.

In testimony whereof I have signed my name to this specification in the presence of two subscribing witnesses.

GEORGE A. STANBERY.

Witnesses:
CARNOTE F. LUMB,
J. S. WHEELER.

Copies of this patent may be obtained for five cents each, by addressing the "Commissioner of Patents, Washington, D. C."